United States Patent Office 3,353,636
Patented Nov. 21, 1967

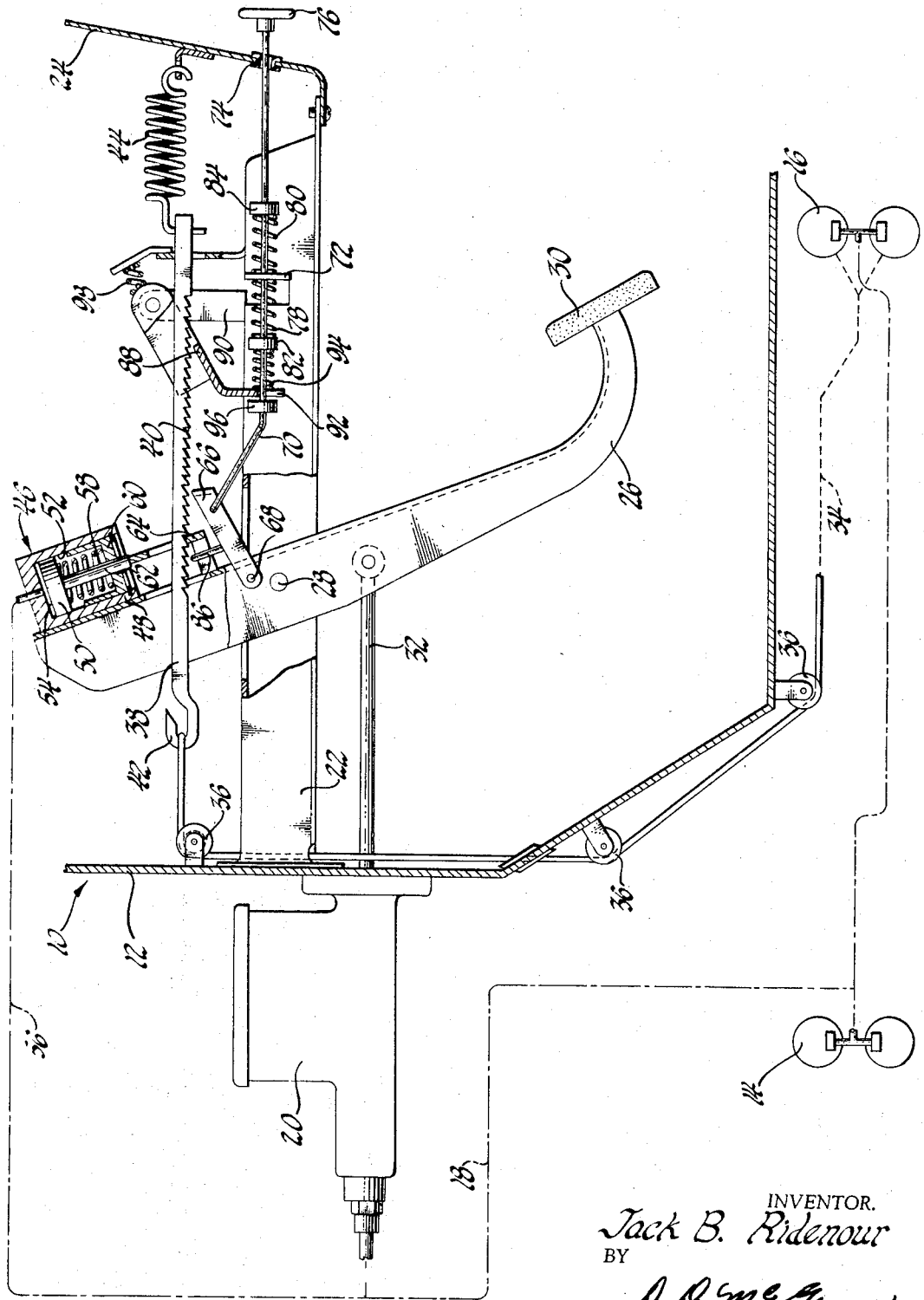

3,353,636
SINGLE LEVER PRIMARY AND SECONDARY
VEHICLE BRAKE ACTUATING ARRANGEMENT
Jack B. Ridenour, Lansing, Mich., assignor to General
Motors Corporation, Detroit, Mich., a corporation of
Delaware
Filed Sept. 15, 1966, Ser. No. 579,670
6 Claims. (Cl. 188—106)

The invention relates to a brake arrangement for a vehicle wherein the service brake pedal actuates the primary brake system and also mechanically actuates a secondary brake system. It has been common practice to provide a vehicle with a brake pedal which actuates a primary or service brake system connected to the front and rear vehicle wheels, and a separate secondary brake system operated by a hand lever or foot pedal which mechanically actuates only the rear wheels. The secondary system is usually referred to as a parking or emergency brake arrangement. The invention relates to a system in which the usual service brake pedal normally operates the service brake system, and is also connected to mechanically operate the secondary brake system. The secondary system may be operated by the brake pedal lever if for any reason there is insufficient hydraulic pressure developed in the primary brake system to actuate the brakes. The same pedal lever may also be utilized to actuate the secondary system with locking means provided to hold it in the actuated position so that it may serve as a parking brake. This arrangement provides for automatically energizing the secondary system from the service brake pedal so that it operates as a backup system. By use of the arrangement the usual parking brake lever assembly is no longer required, resulting in improved appearance, room, and decreased cost. The arrangement will operate if there is initially no hydraulic pressure generated when the brake pedal is applied, and will also operate if during brake application a loss of hydraulic pressure occurs.

In the drawing:

The figure is a schematic representation of a brake arrangement embodying the invention, with parts broken away and in section.

The vehicle 10 in which the brake arrangement is installed is schematically illustrated as having a firewall 12, front wheel brakes 14, rear wheel brakes 16, a hydraulic brake line 18 and a master cylinder assembly 20. The master cylinder assembly is mounted on the firewall 12 and is hydraulically connected to the brakes 14 and 16 by the hydraulic brake line 18. A pedal support bracket 22 is mounted on the firewall 12 and the vehicle instrument panel frame 24. The brake lever 26 is pivotally mounted by pivot pin 28 on the bracket 22. The brake pedal 30 is positioned on the lever 26 so that it is readily accessible for actuation by the vehicle operator. The push rod 32 connects the lever 26 to the master cylinder 20 so that depression of the brake pedal 30 actuates the master cylinder. A suitable brake booster mechanism may be utilized in the usual manner between the push rod 32 and the master cylinder 20.

The mechanical brake operating linkage includes the brake cable 34 connected to suitable mechanical brake operating means in the rear brake 16 such as that presently utilized for actuating the rear brakes by a parking brake arrangement. The cable 34 is illustrated as passing over pulleys 36 suitably positioned for the purpose. The end of the brake cable extending into the passenger compartment is connected to a toothed ratchet 38. The ratchet is illustrated as being formed as a rod with ratchet teeth 40 provided on the lower side thereof and a suitable connection such as hook 42 connecting the rod to the cable 34. The other end of the rod is connected by a light tension spring 44 to the instrument panel frame 24 so that light tension is maintained on the rod and brake cable when the brake is in the released position.

A power servo 46 is mounted on the end of lever 26 pivotally opposite the pedal 30 and is schematically illustrated as including a housing 48 reciprocably receiving a piston 50 in a cylinder 52 formed in the housing. The piston 50 and the upper end of cylinder 52 form a pressure chamber 54 which is connected by hydraulic line 56 to the hydraulic brake line 18. Spring 58 is received between piston 50 and a spring seat 60 in the lower end of the cylinder 52 so that the piston is urged upwardly into chamber 54. A piston rod 62 extends through the spring seat 60 and has a pawl 64 attached thereto. When there is no hydraulic pressure in chamber 54, pawl 64 engages the toothed ratchet 38, as shown in the drawing. The selected pre-load and strength of spring 58, together with the area of piston 50, establishes the minimum brake line hydraulic pressure which will move piston 50 downwardly and therefore move pawl 64 out of engagement with the teeth of ratchet 38.

A second pawl 66 is pivotally mounted at 68 on lever 26 on the opposite side of pivot pin 28 from the brake pedal 30 and extends upwardly to a point adjacent the ratchet teeth 40. A control rod 70 has one end connected to pawl 66 and extends rearwardly through a guide 72 formed on bracket 22 and a grommet 74 positioned in the instrument panel frame 24 and terminates in a control knob 76. Centering springs 78 and 80 are positioned on opposite sides of guide 72 about control rod 70 and respectively engage spring retainers 82 and 84, which are secured to the control rod. These springs function to normally center the control rod in the position shown wherein pawl 66 is disengaged from teeth 40 but immediately adjacent them. A hook 86 is attached to pawl 66 and hooks over an extension formed on pawl 64 so as not to interfere with downward movement of pawl 64 and permitting upward movement of that pawl into full toothed engagement with teeth 40 when pawl 66 is in the position shown. A third pawl 88 is pivotally mounted on an extension 90 of bracket 22 so that the pawl extends forwardly and in engageable relation with ratchet teeth 40. The pawl has an arm 92 extending forwardly and downwardly with the end thereof receiving control rod 70 loosely therethrough. The spring 94 positioned on control rod 70 engages spring stop 82 on the opposite side from spring 78 and also engages the pawl arm 92. A stop 96 is secured to control rod 70 on the opposite side of arm 92 from spring 94 and is spaced from the arm when the control rod is in the centered position shown. An overcenter spring 98 is provided between pawl 88 and a part of bracket 22 so that the pawl is yieldingly held in either the disengaged position shown in the drawing or in the engaged position to be described.

When the vehicle brake is actuated in the normal manner and under normal conditions by the operator, the pedal 30 is depressed to pivot the lever 26 clockwise about pivot pin 28 as seen in the drawing. This moves push rod 32 forwardly and causes the master cylinder 20 to pressurize hydraulic brake fluid in the brake line 18 and actuate the front and rear brakes 14 and 16 through the usual hydraulic brake operating means. The pressure so generated in brake line 18 is also transmitted to the power servo 46. At a predetermined brake pressure the piston 50 is moved downwardly sufficiently far to disengage the pawl 64 from the ratchet teeth 40. This pressure may be, for example, a pressure which is slightly less than that required to move the brake shoes into contact with the brake drums when the system is utilized with typical drum brakes. The pressure may also be suitably calibrated for use with brake systems having disc brakes. When the pawl 64 is in the disengaged position, brake applying movement of the lever 26 has no effect on the mechanical brake linkage.

If for some reason brake line pressure is not generated in line 18 upon brake applying movement of the lever 26, so that the power servo 46 is not energized, the pawl 64 will remain in engagement with ratchet teeth 40 and brake applying movement of the lever will cause the ratchet rod 38 to move rearwardly, tensioning brake cable 34 and actuating the mechanical brake operating means in the rear brakes 16. Thus the vehicle rear brakes will be mechanically applied through continued action by the vehicle operator which is identical to the action performed by him when he normally applies the hydraulic service brakes. When the operator releases the pedal 30, the lever 26 will return to the released position shown, as will pawl 64 and ratchet 38. The brakes will therefore be mechanically released at this time.

When it is desired to mechanically set the rear brakes for parking purposes the vehicle operator presses inwardly on the control knob 76. This causes control rod 70 to move pawl 66 upwardly into engagement with the ratchet teeth 40. The only force which the vehicle operator has to overcome to accomplish this is the small force exerted by centering spring 80. This movement also acts through spring retainer 82, spring 94, and pawl arm 92 to move the locking pawl 88 upwardly into engagement with the ratchet teeth 40. This will cause the spring 98 to pass over center so that it tends to hold the locking pawl 88 in this position even after the control knob 76 is released and returned to the center position by springs 78 and 80. While holding control knob 76 is sufficient to keep pawl 66 engaged with teeth 40, the operator presses downwardly on the brake pedal 30 to pivot lever 26, thereby causing pawl 66 and the ratchet 38 to move rearwardly to tension brake cable 34. Release of the brake pedal 30 will allow the pedal to return to release position, but pawl 88 will retain the ratchet 30 in the applied position. If the operator desires to apply the brakes with additional mechanical force, he need only release the pedal 30, allowing the pawl 66 to move forwardly, ratcheting over teeth 40, and engaging different teeth so that the ratchet 38 may be moved further rearwardly by again depressing pedal 30 to further tension cable 34. The locking pawl 88 will hold the brake cable 34 in tension upon release of the control knob 76. Since the brake pedal 30 is released, the master cylinder 20 will also be released so that no hydraulic pressure will hold pawl 64 out of engagement with teeth 40. Thus this pawl will also tend to hold ratchet 40 in the brake applied position.

When the operator desires to release the brake from the parking brake mode, he pulls the control knob 76 rearwardly against the force of centering spring 78. This causes pawl 66 to pivot clockwise so that hook 86 pulls pawl 64 out of engagement with teeth 40. Stop 96 also engages pawl arm 92, and the locking pawl 88 is moved to the released position shown in the drawing. The locking pawl then is held in that position by the overcenter spring 98. Thus the ratchet 38 is released and the mechanical brake operating means at the rear brake 16 no longer holds the brakes in the applied position.

I claim:

1. A single lever hydraulic primary brake and mechanical secondary brake arrangement for a vehicle, comprising:

a vehicle brake having hydraulic brake operating means and mechanical brake operating means, a hydraulic master cylinder connected to said hydraulic brake operating means to hydraulically operate said brake, mechanical linkage including a toothed ratchet connected to said mechanical brake operating means and movable to mechanically operate said brake, a single brake lever pivotally movable and connected to actuate said master cylinder when pivoted in one direction, and a ratchet tooth-engaging pawl on said brake lever normally engaging said toothed ratchet and having a power servo moving said pawl out of ratchet engagement upon generation of a predetermined minimum master cylinder pressure, said pawl engaging said ratchet whenever the master cylinder pressure is below said predetermined minimum and moved by said brake lever to mechanically operate said brake upon movement of said brake lever in the brake applying direction.

2. The brake arrangement of claim 1, said power servo being hydraulically connected with a hydraulic brake line connecting said master cylinder and said vehicle brake, and having spring means urging said pawl into engagement with said toothed ratchet and acting in opposition to hydraulic action of said servo.

3. The brake arrangement of claim 1, said pawl being mounted on said lever pivotally opposite a lever pedal and moving said ratchet to tension said mechanical linkage when said lever is moved in the brake applying direction and said power servo is not actuated.

4. The brake arrangement of claim 1 further comprising:

a second pawl pivotally mounted on said lever adjacent said first named pawl and normally disengaged from said toothed ratchet, manual means connected to move said second pawl into engagement with said toothed ratchet, actuation of said lever acting through said second pawl to operate said mechanical linkage and said mechanical brake operating means independently of said first named pawl.

5. The brake arrangement of claim 4 further comprising:

a third pawl pivotally movable by said manual means to one position disengaged from said toothed ratchet and to another position engaged with said toothed ratchet and preventing mechanical linkage release when so engaged while permitting movement of said toothed ratchet in the brake apply direction by said second pawl.

6. The brake arrangement of claim 5 further comprising overcenter spring means holding said third pawl in either one of said positions.

References Cited

UNITED STATES PATENTS 3,025,713  3/1962  Koshaba et al. _____ 188—106 X
3,242,760  3/1966  Keen et al. _____ 188—106 X DUANE A. REGER, *Primary Examiner.*